J. & C. REUSE.
RESILIENT WHEEL.
APPLICATION FILED MAR. 14, 1908.
921,283.
Patented May 11, 1909.
3 SHEETS—SHEET 1.
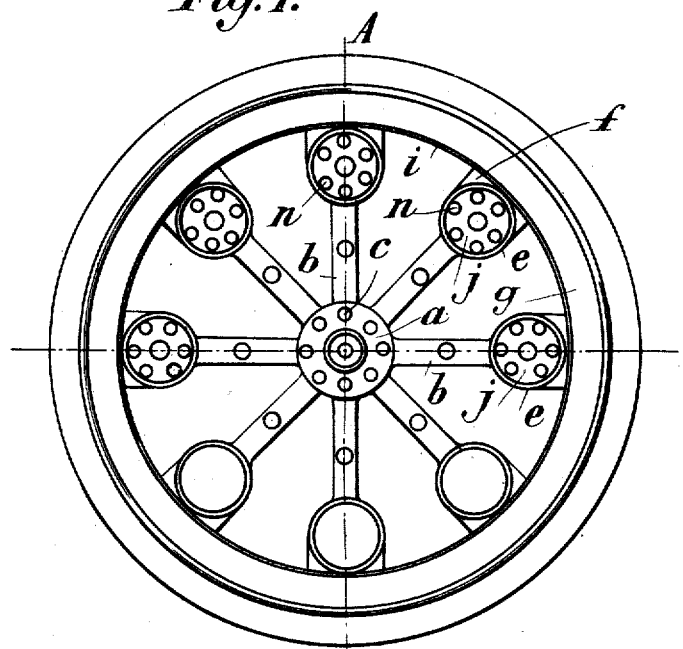
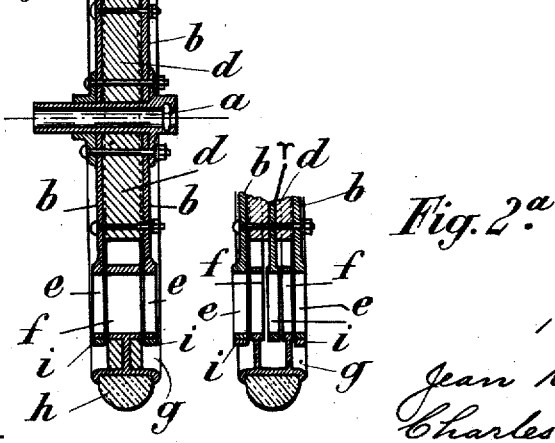

J. & C. REUSE.
RESILIENT WHEEL.
APPLICATION FILED MAR. 14, 1908.
921,283.
Patented May 11, 1909.
3 SHEETS—SHEET 2.
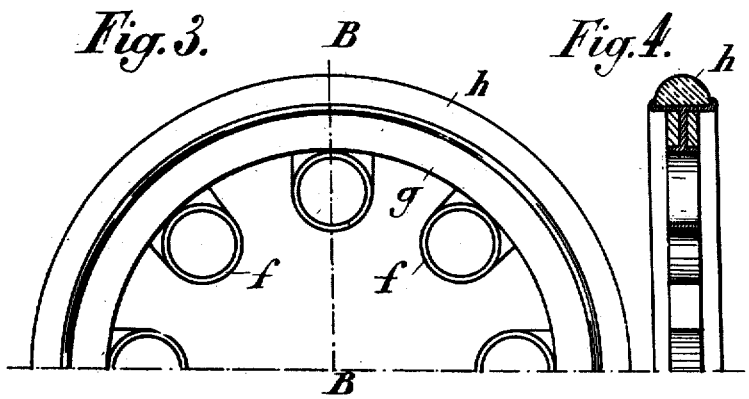
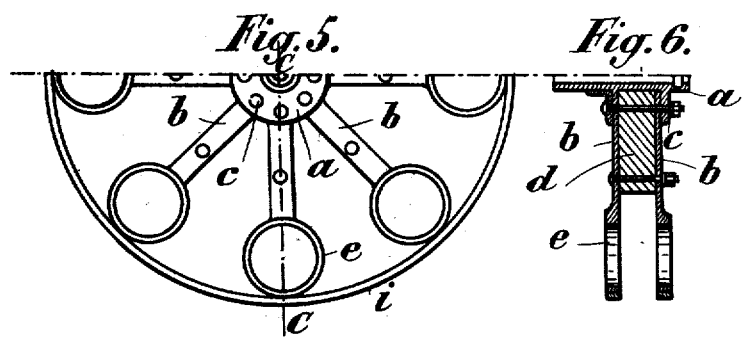
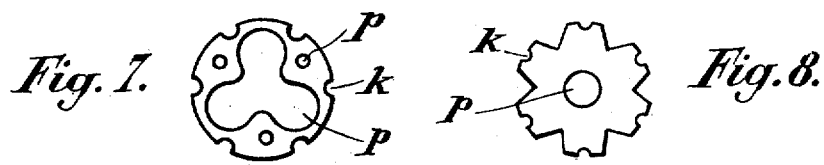
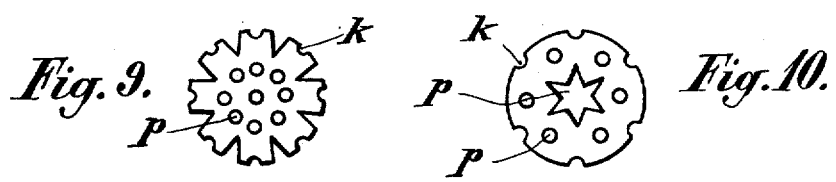
WITNESSES
W. P. Burke
W. H. Kennedy
INVENTORS
Jean Reuse
Charles Reuse
ATTY.

J. & C. REUSE.
RESILIENT WHEEL.
APPLICATION FILED MAR. 14, 1908.
921,283.
Patented May 11, 1909.
3 SHEETS—SHEET 3.
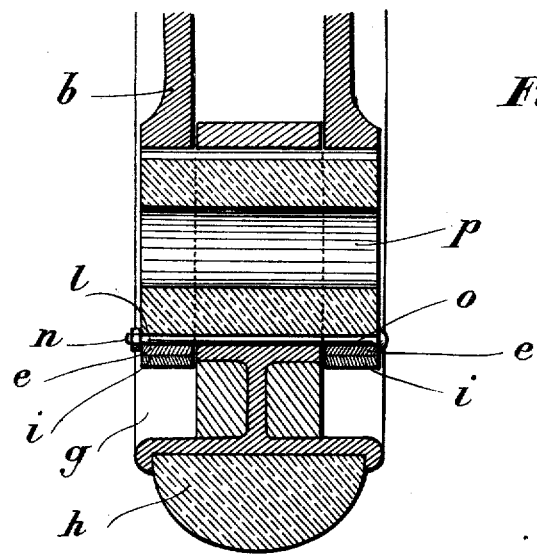
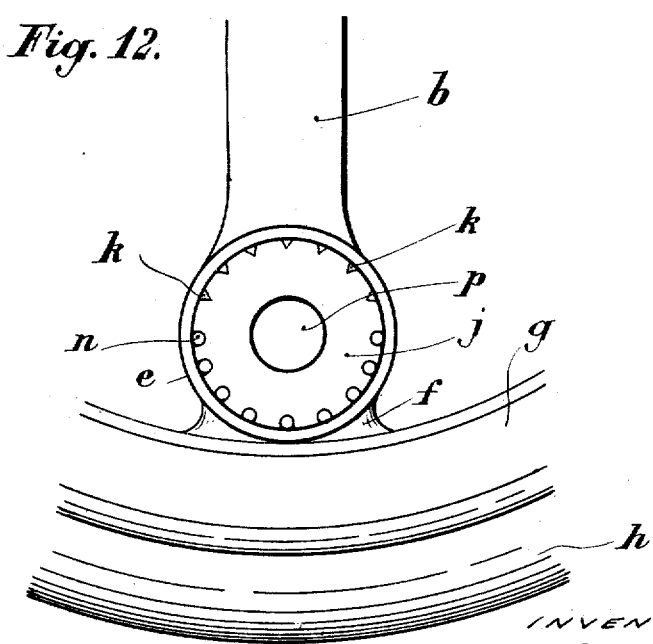

UNITED STATES PATENT OFFICE.

JEAN REUSE AND CHARLES REUSE, OF HAL, BELGIUM.

RESILIENT WHEEL.

No. 921,283.   Specification of Letters Patent.   Patented May 11, 1909.

Application filed March 14, 1908. Serial No. 421,071.

*To all whom it may concern:*

Be it known that we, JEAN REUSE and CHARLES REUSE, subjects of the King of Belgium, residing at Hal, Belgium, have invented new and useful Improvements in Resilient Wheels, of which the following is a specification.

This invention relates to resilient wheels not requiring pneumatic tires and in which the resilient members are interposed between the rim and the spokes or their equivalent.

The known arrangements in which india rubber is employed as the elastic member generally act by the crushing of the india rubber which not only does not give very great elasticity but also presents the defect of damaging the india rubber and of depriving it of its elasticity after it has been in use for some time. This is the case in particular when the elastic member is constituted by a cylindrical block of india-rubber resting upon the rim or a part solid with the rim and through the center of which there passes a bolt or rod fixed to the extremity of the spoke. When each of the spokes of a wheel is provided with a device of this kind the load and the vibration are distributed among all the blocks of india rubber but upon one half only of the thickness of each of these blocks and the continual crushing of the material upon the small part of each of the blocks at a time, has the result of hardening it and also of enlarging the opening serving for the reception of the fixing bolt.

The present invention has for its object an arrangement which obviates these defects by distributing the load and the vibration over the whole of all the india rubber blocks and acting, not by crushing but rather by deformation and compression of the blocks as a whole.

The invention includes the features of construction and arrangement and combination of parts hereinafter described and particularly set forth in the appended claims.

A wheel constructed in accordance with the present invention is illustrated by way of example in the accompanying drawing, in which:—

Figure 1 is a front elevation of the wheel. Fig. 2 is a vertical section on the line A—A of Fig. 1, the three lower spokes being represented before being fitted with their india rubber blocks. Fig. 2ᵃ is a similar view to Fig. 2 illustrating a modified construction. Fig. 3 is a front elevation, and Fig. 4 is a vertical section on the line B—B in Fig. 3 through the upper half of the rim and the boxes or casings integral therewith. Fig. 5 is a front elevation, and Fig. 6 is a vertical section on the line C—C in Fig. 5 through the lower half of the hub with its spokes and the frames or casings integral with them. Figs. 7, 8, 9 and 10 illustrate various forms of blocks which may be adopted. Figs. 11 and 12 are views on a larger scale, in vertical section and front elevation respectively, of the extremity of a spoke and of the corresponding part of the rim connected one with the other by a block of india rubber the lower part only of which is provided with pins.

In these figures $a$ is the hub of the wheel to which there are fixed by bolts $c$ the spokes formed by two metal plates $b$, $b$, between which there is fixed a block of wood $d$ extending from the hub approximately half way along the spoke. The free extremities of the plates $b$ end in the form of circles or circular frames or casings $e$ between which are arranged circular boxes or casings $f$ of the same internal diameter which boxes are integral with the rim $g$. The latter is provided externally with a solid india-rubber or a metal tire $h$.

The extremities of the spokes are connected one with the other by circles $i$ which add to the rigidity of the whole structure. The spokes may be formed with one or more intermediate plates or branches $r$ (Fig. 2ᵃ) likewise provided with frames or casings $e$ and the boxes or casings $f$ on the rim are then formed in two or more parallel sections, separated by spaces in which the intermediate frames of the spokes are located.

When the spokes are arranged in place in the rim in such a manner that the openings in their frames $e$ correspond with those in the boxes $f$ on the rim, india rubber blocks $j$ of cylindrical or other appropriate form are introduced into these openings, their extremities coming flush with the outer edges of the two frames of each spoke in such a manner as to key the spokes and the rim together.

As shown more clearly in Figs. 7, 8, 9 and 10, these india rubber blocks are preferably formed with longitudinal grooves $k$ in their periphery for the reception of pins $l$ between the block and the inner wall of the frames and of the box. These pins $l$ may or may not be provided with heads $n$ and with a nut $o$ screwed upon their free extremity after they have been placed in position. When the pins are not provided with heads covers may be fixed against the outer edges of the frames e.

The blocks may be solid or provided with an opening at the center or with several openings p arranged symmetrically, of circular star or other shape. Their periphery may also be cut star shape as shown in Figs. 8 and 9 or into any other appropriate form.

The constructional details of the spokes and of the rim may obviously vary without departing from the principle of the invention.

What we claim as new and desire to secure by Letters Patent, is:

1. In a resilient wheel, the combination with the rim and spokes, of casings integral with the rim, casings integral with the spokes, india rubber blocks fitted in openings in the rim casings and also in openings in the spoke casings, the said blocks keying the rim and spokes together and pins arranged at intervals between the blocks and the walls of the openings in the rim casings and spoke casings.

2. In a resilient wheel, the combination with the rim and spokes, of casings open on both sides integral with the rim, and casings open on both sides integral with the spokes, india rubber blocks formed with longitudinal openings fitted in the openings in the rim casings and also in the openings in the spoke casings and pins arranged at intervals between the blocks and the inner walls of the rim casings and spoke casings.

3. A resilient wheel comprising a rim and spokes, india-rubber blocks keying the parts together, and pins inserted at intervals between each block and the said parts, and said pins extending transversely of the wheel and being of substantially the same length as the rubber blocks substantially as described.

In testimony whereof we have signed our names to this specification in the presence of two subscribing witnesses.

JEAN REUSE.
CHARLES REUSE.

Witnesses:
H. T. E. KIRKPATRICK.
AD. VOGEL.